Patented Feb. 10, 1931

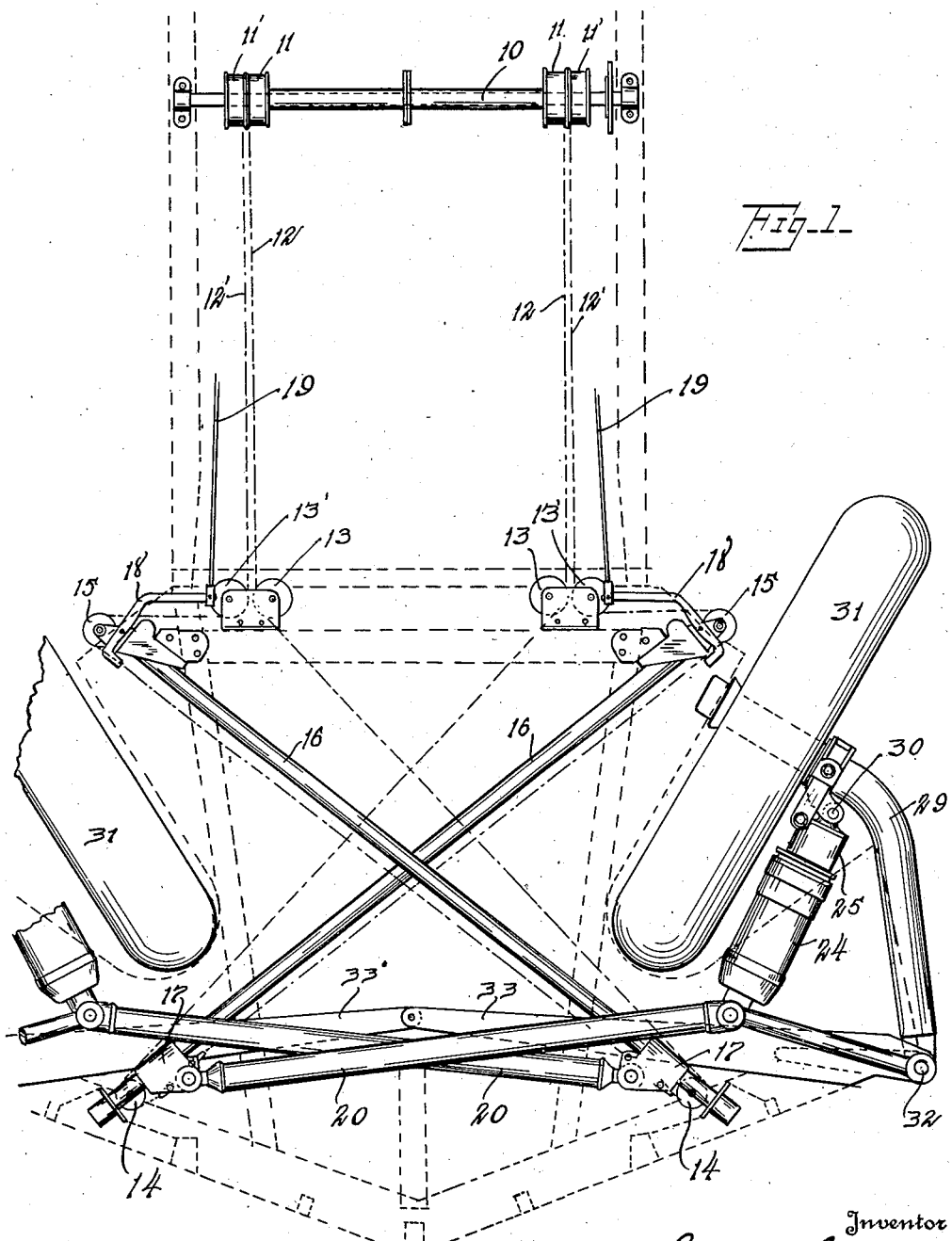

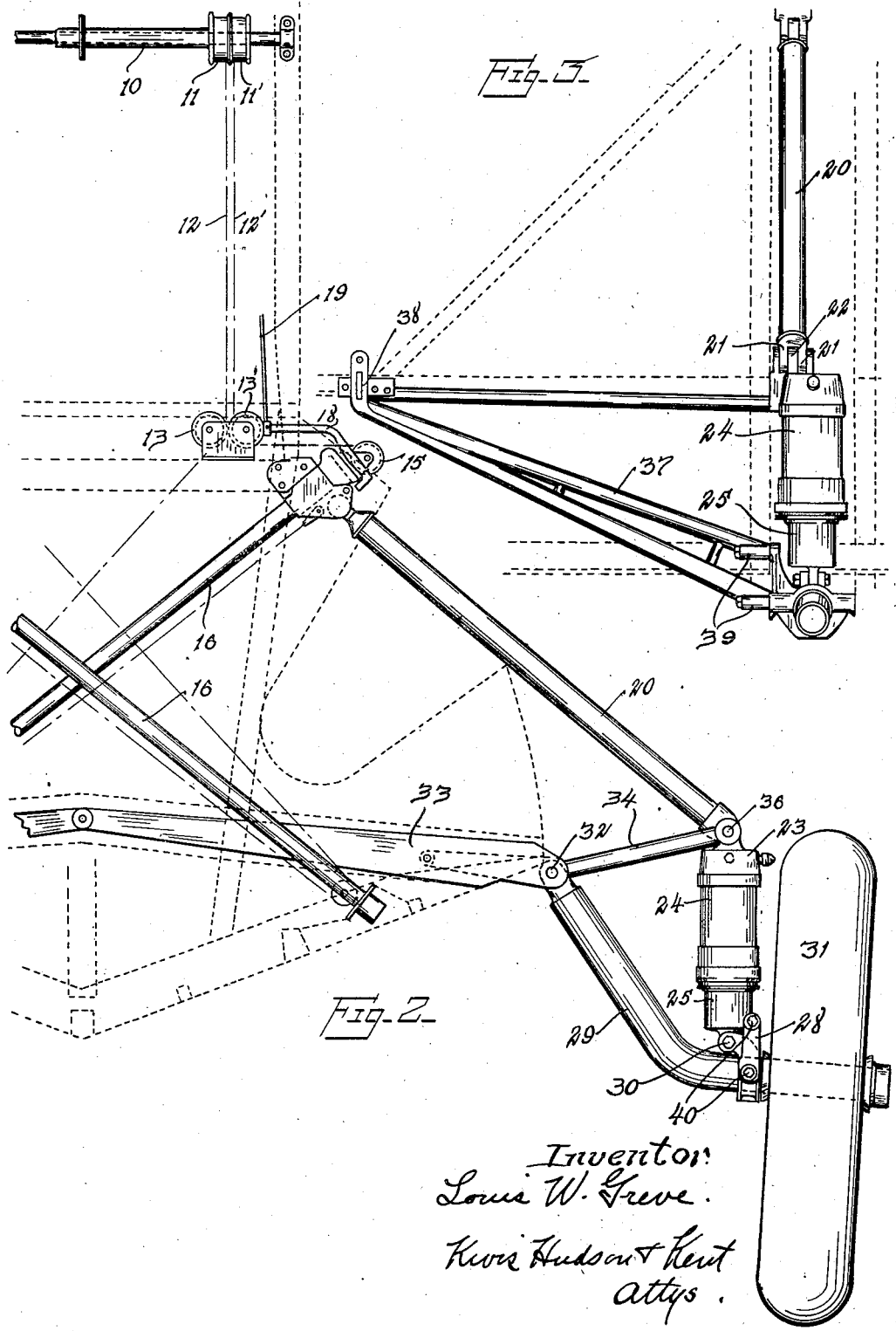

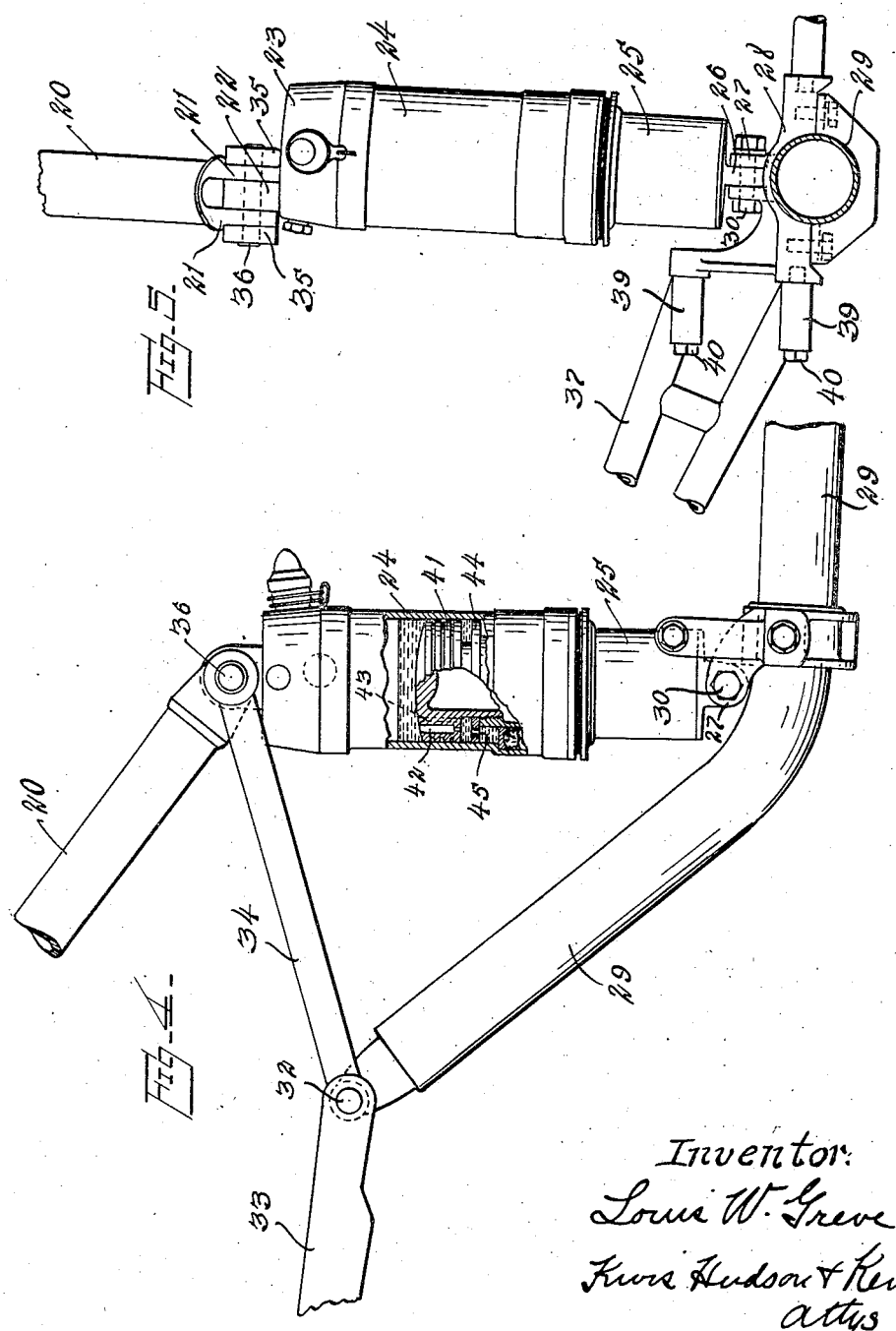

1,791,721

UNITED STATES PATENT OFFICE

LOUIS W. GREVE, OF CLEVELAND, OHIO, ASSIGNOR TO THE CLEVELAND PNEUMATIC TOOL COMPANY, OF CLEVELAND, OHIO, A CORPORATION OF OHIO

AMPHIBIAN SHOCK ABSORBER

Application filed September 10, 1928. Serial No. 304,940.

This invention relates to improvements in amphibian shock absorbers, and has reference particularly to a retractable landing gear embodying a hydro-pneumatic shock absorber. In air craft of this type the landing gear must be retracted at times when the plane is alighting upon the water, and in practice it is retracted also during flight in order to reduce wind resistance. It is so mounted and operated that it can be let down into operative position by the pilot without leaving his position in the cockpit when a landing is about to be made.

In order that there may be a cushioning action between the ground wheels and the amphibian proper, it is necessary that the wheel axles have movement in a transverse vertical plane, but it is quite essential that the mounting of the axle be such that it can partake of no other motion. Hence, in retractable landing gears the axle is ordinarily made a part of a framework, usually of triangular form, in a transverse vertical plane, and laterally braced, which lends rigidity to the axle mounting. The elements of this framework, as heretofore constructed, have been rigid and whatever resiliency there has been in the mounting of the axle has been provided by shock absorbing means interposed between the amphibian frame and the triangular axle frame.

In the present invention I substitute for one of the rigid elements of the triangular frame, above mentioned, a shock absorber of the telescoping type, the two parts of which are adapted to have a relative movement longitudinally and in no other direction. This shock absorbing element is positioned in the side of the triangle which is opposite its pivotal connection with the frame of the amphibian, and the joints between the elements of the triangle are made pivotal. Hence, the triangle frame in my invention, in contradistinction to previous constructions, does not possess rigidity in its own plane. It is, however, entirely rigid in so far as forward and backward or twisting movement of the axle is concerned.

One of the objects of the invention, therefore, is the provision of a retractable landing gear, including a shock absorber contained entirely within the swinging unit.

Another object of the invention is the provision of a landing gear of the character specified, having a triangular axle frame, the parts of which are movable in their own plane and yieldably held in normal position with respect to each other my means of a hydropneumatic shock absorber.

Other objects and features of novelty will appear as I proceed with the description of that embodiment of the invention which, for the purposes of the present application, I have illustrated in the accompanying drawings, in which, Figure 1 is a front elevational view of a landing gear in retracted position, portions of the operating mechanism therefor being illustrated somewhat diagrammatically.

Figure 2 is a similar view showing one side only of the landing gear in operative position.

Figure 3 is a side elevational view of one side of the landing gear with the ground wheel removed.

Figure 4 is a fragmental front elevational view on a larger scale, illustrating the triangular axis frame, certain portions of the shock absorber being broken away to disclose the internal structure thereof.

Figure 5 is a side elevation of the structure shown in Figure 4.

The mechanism herein illustrated for lowering and retracting the landing gear forms no part of my invention, and will, therefore, be referred to briefly merely for the purpose of enabling the reader to obtain a better understanding of the present invention. In the drawing the shaft 10, which can be rotated by any convenient means, from the cockpit of the amphibian, carries two pairs of winding drums 11, 11'. Cables 12, 12' are wound upon these drums in opposite directions, so that when the shaft 10 turns one cable winds up while the other unwinds. These cables pass over suitable pulleys 13, 13', mounted upon the framework of the amphibian, and pulleys 14 and 15 mounted at the ends of inclined guide bars 16.

On each of the guide bars 16 there is a slide 17 to which the lower ends of the cables 12 and 12' are attached. Hence, as the shaft 10 turns in one direction or the other, each of the slides 17 moves up or down upon its guide bar 16. When the slides 17 reach the upper limit of their motion they are locked in that position, preferably by automatic means, and levers 18 are shifted thereby acting through suitable connections, including rods 19, to operate indicators on the instrument board to show that the landing gear is in condition to perform its function.

Pivotally connected with each of the slides 17 there is a retracting bar 20, which functions also as a brace when the landing gear is in operative position. On its opposite end the bar 20 may be provided with a pair of spaced perforated lugs 21, which straddle a perforated lug 22 on the head 23 of the upper or cylinder element 24 of a hydro-pneumatic shock absorber. The lower or piston element 25 of the shock absorber carries a perforated lug 26 parallel to the lugs 21 and 22, which extends between perforated lugs 27 carried by a bracket 28 fixed to the axle 29 of the ground wheel. The lugs 26 and 27 are pivotally connected by means of a bolt 30 which extends through their perforations.

As shown in the drawings, the axle 29 has an outer nearly horizontal portion adapted to receive a ground wheel 31, and an inner upwardly inclined portion. The inner extremity of the axle is pivotally connected by a bolt 32 with a transverse bracing member 33 carried by the frame of the amphibian.

The bolt 32 also extends through a suitable lug or lugs on the inner end of a brace 34, the outer end of which carries two spaced lugs 35 which straddle the lugs 31 of the retracting bar 20. A bolt 36 extends through the perforations of all the lugs 22, 21 and 35 thus pivotally connecting them together.

I, therefore, have a triangular axle frame, the first element of which is the brace 34, the second element being the inclined portion of the axle 29, and the third element comprising the telescoping parts 24 and 25 of the shock absorber.

The bolts 30, 32 and 36 are all parallel, and hence permit movement of the elements of the triangle in their own plane, but prevent relative movement of any other kind whatsoever between these parts. In order that the triangle itself may not be bodily moved about a vertical or about a transverse horizontal axis, there is provided a lateral brace 37 which is pivotally mounted upon the frame of the amphibian at 38 (see Fig. 3) about an axis in alignment with the axis of bolt 32. At its outer extremity this brace may have a pair of legs ending in sleeves 39, which are mounted upon studs 40 fixed in the bracket 28.

The hydro-pneumatic shock absorber which I employ may vary considerably in detailed construction without affecting the present invention, but that which I prefer at the present time embodies a cylinder element 24 and a piston rod 25, the internal construction being illustrated to some extent in Figure 4, where the piston head is shown at 41. At intervals throughout its periphery this head is provided with passages 42 having constrictions at their lower ends. In addition, there is a series of unconstricted passages 43. Below the head there is a ring valve 44, which has a limited movement lengthwise of the piston stem. This valve is provided with ports 45 in alignment with the passages 42. Whenever a force of compression acts upon the shock absorber tending to telescope the parts together, the ring valve 44 occupies the position illustrated in Figure 4, and the liquid above the piston head flows freely through the open passages 43 as well as through the constricted passages 42 into the space beneath the head. Movements tending to extend the parts of the shock absorber, such, for instance, as rebound movements, cause the valve ring to rise from the position illustrated in Figure 4 and to engage the under surface of the piston head. The passages 43 are thus closed off and rendered ineffective. The upward movement of liquid must then take place entirely through the constricted passages 42, and consequently the extension movement between the parts is retarded and the rebound action is checked.

When the landing gear is in the retracted position illustrated in Figure 1, the shock absorber is, of course, in an inverted position, and because of the pressure of the air therein it is fully extended. As the shaft 10 is operated to raise the slides 17 upon the guide bars 16, and thus to cause the bars 20 to swing the triangular axle frames about the pivots 32, the shock absorber is gradually righted, and the air therein takes its natural position above the oil or other liquid employed. The shock absorber, of course, remains fully extended when it reaches the operative position of Figure 2. In making a landing as soon as the wheels 31 strike the ground the compression of the shock absorber begins, the blow being taken by the air. The rebound is checked by the metering of liquid through a small orifice within the shock absorber. This is in acordance with the usual practice in devices of this kind. When the amphibian is at rest and supported upon the running gear the shock absorber parts 24 and 25 are partially compressed. When the machine rises from the ground the internal pressure of the air in the shock absorber again causes the parts 24 and 25 thereof to be extended to their limit of motion, in other words, until the piston head engages a suitable stop provided at or near the bottom of the cylinder. Hence, when the amphibian is in flight and the pilot by operating the retracting mechanism exerts a pull upon the retracting bar 20, that pull is positively transmitted immediately through the shock absorber parts 24, 25 to the axle 29.

While in the foregoing description and acompanying drawings I have disclosed more or less in detail one particular embodiment of the invention, I desire to be understood that such detailed disclosure is employed merely for the purpose of complying with the statutory requirements and is not to be construed as a limitation upon the scope of the invention.

In describing my invention what I claim is:

1. In a retractable landing gear for airplanes, a ground wheel axle, a generally triangular frame for supporting said axle, a pivotal connection between one corner of said frame and said airplane, that side of the frame opposite said pivotal connection comprising a pair of relatively slidable members cushioned against compressing forces.

2. In a retractable landing gear for airplanes, a ground wheel axle, a generally triangular frame for supporting said axle, a pivotal connection between one corner of said frame and said airplane, that side of the frame opposite said pivotal connection comprising a pneumatic shock absorber having the capacity to resist telescopic motion of its parts in either direction.

3. In a retractable landing gear for airplanes, a ground wheel axle, a generally triangular frame for supporting said axle, a pivotal connection between one corner of said frame and said airplane, a brace pivotally connected with the airplane remote from but in alignment with said pivotal connection, the outer end of said brace being connected with said frame, that side of the frame which is opposite said pivotal connection comprising a shock absorber having relatively slidable members, and means to limit the extension thereof.

4. In a retractable landing gear for airplanes, a ground wheel, an axle therefor pivotally mounted to swing in a plane transversely of the airplane, a telescopic shock absorber adapted to resist extension as well as compression, said shock absorber being connected at one end to said axle adjacent the wheel, a retracting bar connected to the opposite end of the shock absorber, and a pivotally mounted brace spacing the last named end of the shock absorber from the pivotal connection of the axle, whereby the axle, shock absorber and brace form substantially a triangle.

In testimony whereof, I hereunto affix my signature.

LOUIS W. GREVE.